(12) United States Patent
Aarskog et al.

(10) Patent No.: US 10,049,818 B2
(45) Date of Patent: Aug. 14, 2018

(54) CAPACITOR SUPPORT SYSTEM

(71) Applicant: Siemens Aktiengesellschaft, Munich (DE)

(72) Inventors: Fredrik Gundersen Aarskog, Oslo (NO); Knut Schonhowd Kristensen, Hamar (NO); Miroslaw Rozycki, Tiller (NO); Arve Skjetne, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/322,481

(22) PCT Filed: Jul. 24, 2015

(86) PCT No.: PCT/EP2015/067045
§ 371 (c)(1),
(2) Date: Dec. 28, 2016

(87) PCT Pub. No.: WO2016/020212
PCT Pub. Date: Feb. 11, 2016

(65) Prior Publication Data
US 2017/0140872 A1    May 18, 2017

(30) Foreign Application Priority Data

Aug. 7, 2014 (EP) .................................. 14180238

(51) Int. Cl.
*H01G 4/224* (2006.01)
*H01G 4/38* (2006.01)
*E21B 41/00* (2006.01)

(52) U.S. Cl.
CPC ......... *H01G 4/224* (2013.01); *E21B 41/0007* (2013.01); *H01G 4/38* (2013.01)

(58) Field of Classification Search
None
See application file for complete search history.

(56) References Cited

U.S. PATENT DOCUMENTS 2,383,480 A  *  8/1945  Heyman  ................ H01G 4/258
                                                    361/274.1
2,942,167 A     6/1960  Twaddell et al.
(Continued)

FOREIGN PATENT DOCUMENTS

CH         134768 A       8/1929
EP         2884508      * 12/2013   ............. H01G 4/224
(Continued)

OTHER PUBLICATIONS

International Search Report and Written Opinion dated Oct. 16, 2015.
Extended European Search Report dated Feb. 5, 2015.

*Primary Examiner* — Dion R Ferguson
(74) *Attorney, Agent, or Firm* — Harness, Dickey & Pierce, P.L.C.

(57) ABSTRACT

A capacitor support system includes a support structure configured to support at least one capacitor and a pressure generating module configured to generate a pressure on the at least one capacitor. The pressure generating module includes a bearing plate, a transmission plate, and at least one plate shaped leaf spring provided between the bearing plate and the pressure transmission plate. The pressure generating module is connected to the support structure by the bearing plate. The bearing plate is fixedly connected to the connecting structure in such a way that it provides a bearing surface for the at least one leaf spring and keeps the at least one leaf spring in a compressed state between the bearing plate and the at least one capacitor.

23 Claims, 6 Drawing Sheets

(56) References Cited

U.S. PATENT DOCUMENTS

| | | | | |
|---|---|---|---|---|
| 3,440,494 A | * | 4/1969 | Wade | H01G 4/224 |
| | | | | 361/274.1 |
| 3,508,122 A | * | 4/1970 | Baker | H01G 9/08 |
| | | | | 29/25.03 |
| 3,911,334 A | * | 10/1975 | Brayshaw | H01G 2/14 |
| | | | | 361/274.1 |
| 2011/0164344 A1 | | 7/2011 | Bo et al. | |
| 2013/0175958 A1 | | 7/2013 | McJunkin et al. | |
| 2015/0170839 A1 | * | 6/2015 | Aarskog | H01G 2/10 |
| | | | | 361/273 |

FOREIGN PATENT DOCUMENTS

| | | |
|---|---|---|
| JP | 2001284193 A | 10/2001 |
| WO | WO 2015090728 A1 | 6/2015 |

* cited by examiner

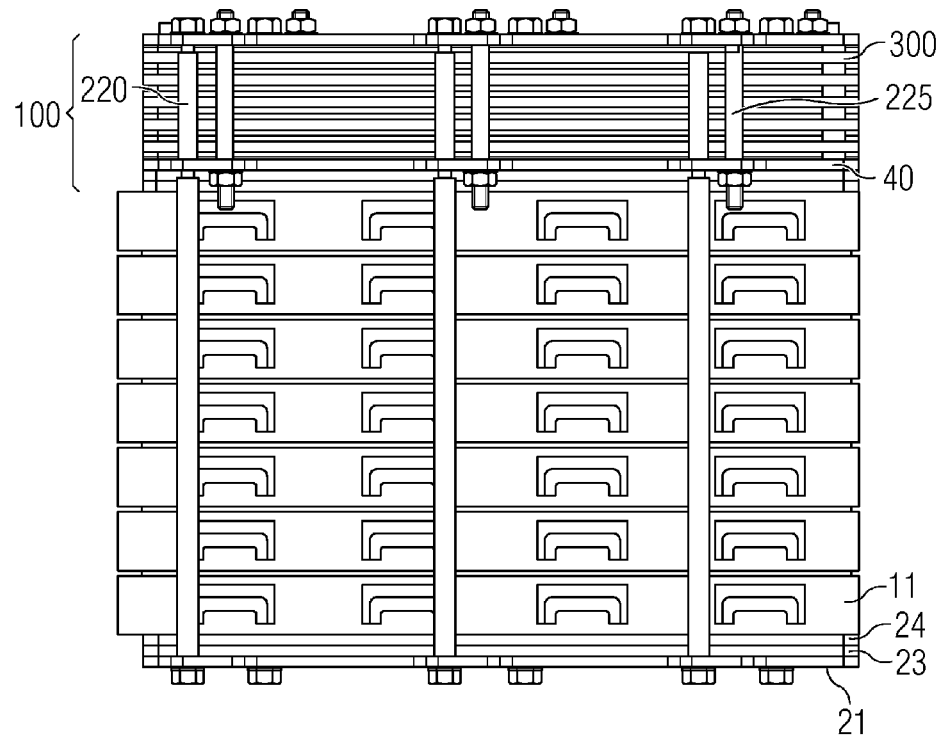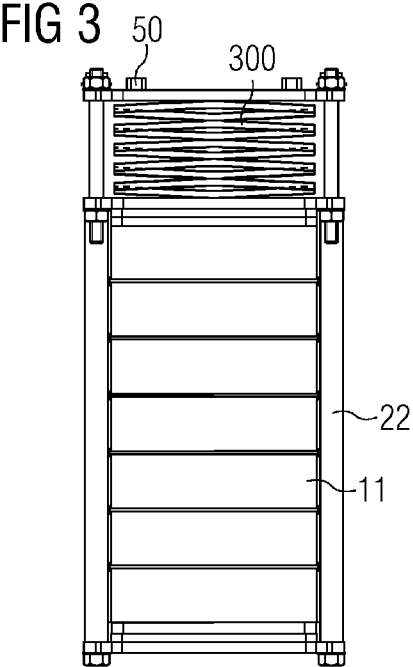

CAPACITOR SUPPORT SYSTEM

PRIORITY STATEMENT

This application is the national phase under 35 U.S.C. § 371 of PCT International Application No. PCT/EP2015/067045 which has an International filing date of Jul. 24, 2015, which designated the United States of America and which claims priority to European patent application number EP 14180238.9 filed Aug. 7, 2014, the entire contents of which are hereby incorporated herein by reference.

FIELD

An embodiment of the present invention generally relates to a capacitor support system with a support structure configured to support a plurality of stacked capacitors. An embodiment of the present invention furthermore generally relates to a subsea variable speed drive comprising the capacitor support system.

BACKGROUND

In deep sea oil or gas production sites, subsea power grids are installed for providing the required electrical power for electrical actuators like electric motors and electric pumps. For controlling an electric motor, voltage, current and AC frequency may be varied. To this end, a variable speed drive (VSD) may be provided in the power grid. These variable speed drives contain inter alia DC link capacitors.

All components including the capacitor inside the subsea VSD enclosure will be located in a pressure compensated fluid volume, e.g. a dielectric fluid such as Midel 7131. This means that all the electrical components will be in contact with the dielectric fluid and will be exposed to the same ambient pressure as the water pressure surrounding the variable speed drive. The current design depth of the subsea variable speed drive is 1 to 3000 meters, which gives a surrounding seawater pressure of approximately to 300 bar resulting in a fluid pressure inside the variable speed drive of approximately 1 to 300 bar. Applications at even higher water depths up to 5000 meters are foreseeable.

Since the DC link capacitor will be exposed to the ambient pressure at the seabed, it must be designed to withstand the mechanical stress that is caused by this pressure. The capacitors used for frequency conversion are often implemented as film capacitors, e.g. metalized film capacitors. The film material normally used in such a film capacitor may be polypropylene, but is not limited to this material wherein the thickness can vary between 1 μm and several hundreds of μm. Before the films are wound in many turns, the films, plastic films, are metalized with a thin layer of aluminium, zinc or other metals in order to provide the metal layer between the dielectric layers. Different methods for winding a metalized film capacitor are known. One possibility to generate such a metalized film capacitor is the stacked winding method, in which one or more films are wound in many turns around a polygon shaped core. The flat sections of the winding are cut out and are used as capacitors while the corner/bent sections are discarded. Another method is a flat winding, in which one or more films are wound in many turns around the core which is often cylindrical. When the winding is completed, the core is removed and the winding is stamped to a flat shape using a strong force.

After winding is completed, the winding is put onto a machine where a metal spray (metal vapour) is applied to both side surfaces of the winding to form contact layers which build electrical terminals. As metals, zinc, aluminium, or zinc and aluminium mixtures may be used, however, also other metals may be used. Furthermore, an additional outer layer of tin spray may be applied to improve the solderability of wires/contact elements to the contact layers.

It is known that an interlayer pressure, i.e. a pressure distributed over the entire surface of the capacitor, between each layer in the capacitor and which is not to be confused with the ambient pressure, is necessary for metalized film capacitors to function when the ambient pressure increases. In atmospheric pressure it is relatively easy to obtain a sufficient interlayer pressure, since the shape of the capacitor is constant. However, due to the volume compressibility of the dielectric film material, the capacitor will be compressed and deformed as the ambient pressure increases. By way of example, a typical change in height of a capacitor stack that is 400 mm high can be around 10 mm in subsea application, resulting in a lower height of the capacitor stack of 390 mm.

One aspect of a metalized film capacitor is its ability to self heal. If a local breakdown occurs in the dielectric inside the capacitor, an arc will form and the metal layer around the fault will evaporate. Eventually the arc will be quenched and since the metal layer is gone, the faulty point will be isolated from the rest of the capacitor and the voltage withstand strength of the capacitor will be restored. It is known that increased interlayer pressure reduces energy that is consumed in one of the self healing events. A reduced energy means less heating of the film near a faulty area and a smaller possibility of another breakdown due to excess heating. As a consequence this means that the lifetime will be improved when sufficient interlayer pressure is maintained. Test results in simulations have furthermore shown that a high ambient pressure will significantly impact the capacitor. Due to the large difference of the material properties in the dielectric film, e.g. polypropylene, and the metal spray of the contact surfaces at opposite ends of the capacitor, the capacitor will be deformed when the ambient pressure increases. This deformation will result in sections of the dielectric film having interlayer pressure that is below a needed interlayer pressure.

SUMMARY

Accordingly, the inventors have recognized that a need exists to increase the lifetime of capacitors in high ambient pressure conditions.

This need is met by at least one embodiment of the application. Embodiments are described in the claims.

According to an embodiment of the invention, a capacitor support system is provided comprising a support structure configured to support at least one capacitor. The capacitor support system furthermore comprises a pressure generating module configured to generate a pressure on the at least one capacitor. The pressure generating module includes a bearing plate, a transmission plate, and at least one plate shaped leaf spring, provided between the bearing plate and the pressure transmission plate, the pressure generating module being connected to the support structure by the bearing plate, and the bearing plate being fixedly connected to the support structure so as to provide a bearing surface for the at least one leaf spring and keep the at least one leaf spring in a compressed state between the bearing plate and the at least one capacitor.

An embodiment of the invention furthermore provides a subsea variable speed drive including a capacitor support system described above.

These and other objects, features and advantages of the invention will become apparent when considered with the embodiments and accompanying drawings, wherein like reference numerals indicate like structures throughout the figures.

BRIEF DESCRIPTION OF THE DRAWINGS

FIG. 2 is a side view of a capacitor support system according to another embodiment of the invention.

FIG. 3 is a rear view of the capacitor support system of FIG. 2.

DETAILED DESCRIPTION OF THE EXAMPLE EMBODIMENTS

Figure 1:
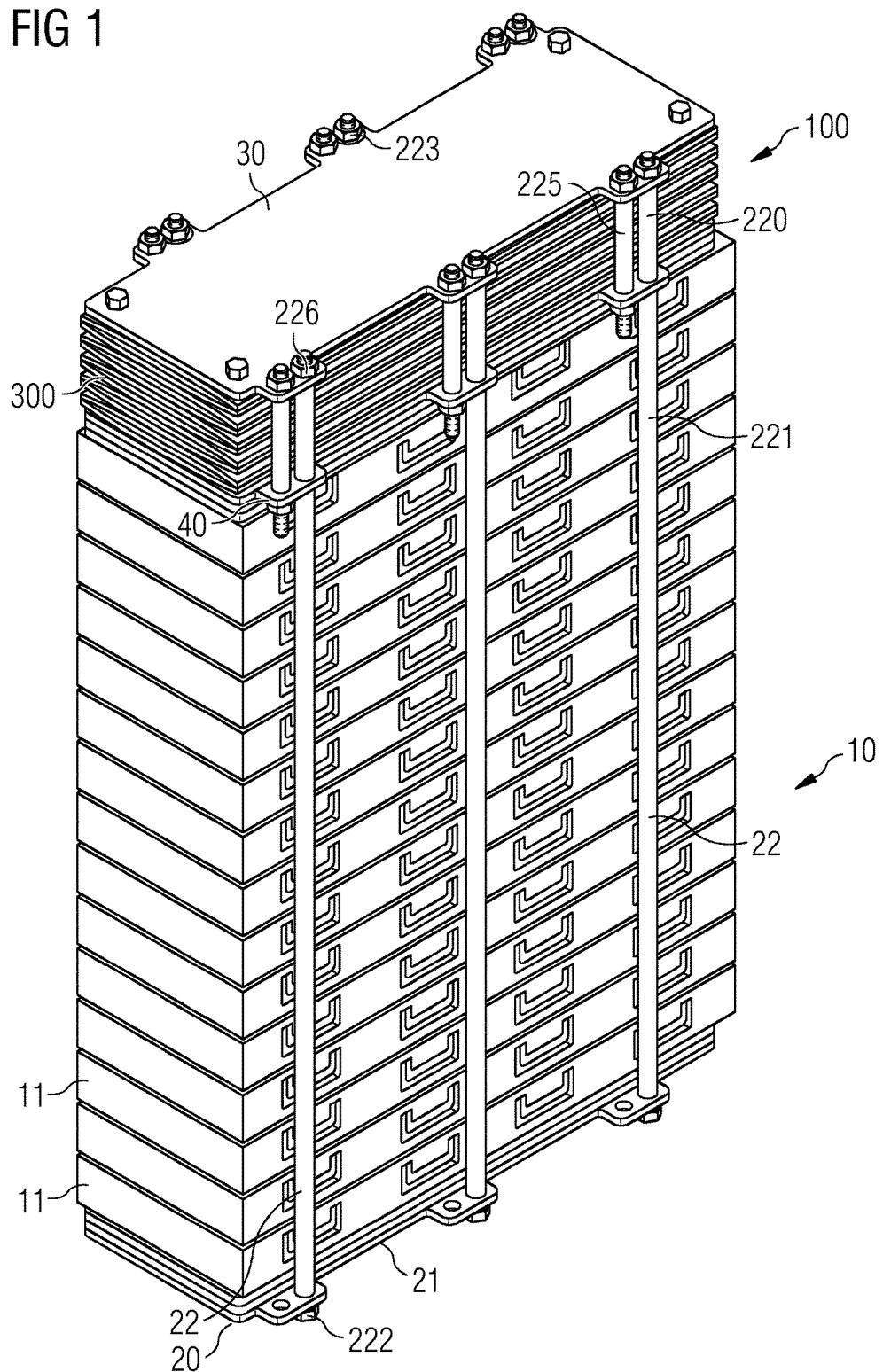
FIG. 1 is a perspective view of a capacitor support system according to a first embodiment of the invention.

According to an embodiment of the invention, a capacitor support system is provided comprising a support structure configured to support at least one capacitor. The capacitor support system furthermore comprises a pressure generating module configured to generate a pressure on the at least one capacitor. The pressure generating module comprises a bearing plate and a transmission plate and at least one plate shaped spring provided between the bearing plate and the pressure transmission plate. Furthermore, the pressure generating module is connected to the support structure by the bearing plate. The bearing plate is fixedly connected to the support structure in such a way that it provides a bearing surface for the at least one leaf spring and keeps the at least one leaf spring in a compressed state between the bearing plate and the at least one capacitor or the transmission plate.

The pressure generating module of the capacitor support system is first of all able to generate a pressure on the at least one capacitor in such a way that the interlayer pressure is above a critical interlayer pressure so that negative impacts due to a low interlayer pressure are avoided. Furthermore, the pressure generating module provides an evenly distributed surface pressure on the capacitor. The capacitor support system has furthermore the advantage that when used in subsea applications in very high ambient pressures, the pressure generating module is able to absorb the reduced height of the at least one capacitor or a plurality of stacked capacitors while maintaining a high pressure on the stack of capacitors. The planar transmission plate is moveable relative to the fixedly installed bearing plate. The at least one leaf spring presses the pressure transmission plate onto the at least one capacitor.

Preferably, the system comprises at least one pair of leaf springs. The two leaf springs of the pair of leaf springs are arranged relative to each other between the bearing plate and the transmission plate in such a way that the plate shaped springs only contact each other at edge sections of the plate shaped springs and that a closed space is generated between the two plate shaped springs that is closed in opposite directions by the two plate shaped springs.

The pressure generating module can furthermore comprise at least one guiding pin positioning the at least one leaf spring between the bearing plate and the transmission plate, the guiding pin guiding a movement of the leaf springs, wherein each of the leaf springs comprising at least one opening for receiving the at least one guiding pin. When the capacitor support system is exposed to different ambient pressures, the height of the stacked capacitors will vary and the pressure generating module will absorb this height difference with a compression or depression of the at least one leaf spring. This compression or depression of the leaf spring is guided by the at least one guiding pin.

Each of the plate shaped leaf springs of the pair of leaf springs forms a convex surface and the convex surfaces of one pair of leaf springs extend in opposite directions. In the direction of the stacked capacitors one of the leaf springs of the pair of leaf springs forms a convex surface and another convex surface facing the opposite direction generate a closed space in between. It is furthermore possible that at least two pairs of leaf springs are provided in the pressure generating module, wherein one leaf spring of one pair of leaf springs and one leaf spring of a neighbouring pair of leaf springs contact each other at their apex. When two or more pairs of leaf springs are provided, each pair of leaf springs contacts another pair of leaf springs at an apex of one of the leaf springs. The distance traversed by the leaf springs and the pressure generating module can be increased without reducing the force/pressure generated by the pressure generating module to the stacked capacitors.

The convex surface of one of the leaf springs of the pair of leaf springs may face the bearing plate, whereas the convex surface of the other of the leaf springs of the pair of leaf springs faces the planar transmission plate. As stated above, the two leaf springs of one pair of leaf springs do not extend parallel to the other in the same direction, but are arranged in opposite directions relative to each other.

Furthermore, it is possible that an apex of one of the convex surfaces of one leaf spring contacts the planar bearing plate wherein an apex of another of the convex surfaces of one leaf spring contacts the planar transmission plate. When the stack of capacitors and the leaf springs are arranged on top of one another, the pressure transmitted by the transmission plate is transmitted to the central part of the capacitor surface and not to the edges of an upper capacitor surface. In another embodiment, the outer edge section of one leaf spring contacts the bearing plate.

Preferably, the plate shaped leaf spring substantially covers the same surface as the planar bearing and the transmission plates or the same surface as the stacked capacitors.

The support system may furthermore comprise a pressure distribution plate located between the transmission plate and an upper surface of the capacitor(s), wherein the pressure distribution plate has a higher elasticity than the transmission plate. The pressure distribution plate, which is of a softer material than the transmission plate helps to improve the pressure distribution transmitted to the stack of capacitors as the pressure distribution plate helps to distribute the pressure to the complete surface of the capacitors. This can help to make sure that the interlayer pressure in the capacitor is high enough over the complete surface of the capacitor.

The connecting structure may further comprise a threaded rod, wherein the bearing plate comprises at least one through hole in which a corresponding threaded rod is located, wherein the pressure generating module is connected to the support structure via at least one threaded rod.

The pressure generating module may be provided in the support system at one end of the stack of capacitors. In another embodiment, two pressure generating modules may be provided, one at one end of the support structure and the other at the opposite end of the support structure.

An embodiment of the invention furthermore provides a subsea variable speed drive including a capacitor support system described above.

In FIG. 1, a schematic view of a capacitor support system 10 is shown in which a plurality of capacitors 11 are provided in a stack of capacitors, one above the other. The stacked capacitors 11 are held in place by a support structure 20 with a bottom plate 21 and a plurality of support bars 22 attached to the bottom plate 21), the bottom plate and support bars defining the space where the capacitors 11 are arranged. In the embodiment of FIG. 1, the stack of capacitors comprises 15 capacitors on top of one another. However, it should be understood that any number of capacitors could be located in the support structure 20).

In the embodiment shown, a single capacitor covers the surface of the bottom plate 21. In another embodiment, two or more capacitors arranged side by side cover the surface of the bottom plate 21.

The support structure with the support bar 22 comprises a threaded rod 220 which extends over the entire length of support system, wherein the threaded rod 220 is provided inside an insulation 221 to insulate the threaded rod from the capacitors 11). The threaded rod 220 is connected to the bottom plate 21 using fixing elements 222), such as a female screw on the lower portion of the support system and to a top plate 30), which plays the role of a bearing plate as will be explained hereinafter. The threaded rod 220 is connected to the bearing plate 30 using fixing elements such as female screws 223).

In the embodiment shown in FIG. 1, the system is indicated in a transport or manufacturing state not ready for use. As can be seen in FIGS. 1 and 2, next to the threaded rod 220 extending over the entire length of the system, a shorter transport rod 225 is provided, which extends substantially over the length of a pressure generating module 100 which will be discussed further below in connection with FIGS. 6 and 8 in which a plurality of leaf springs 300 are provided. The arrangement of the leaf springs in the pressure generating module will be discussed in further detail below. The rod 225 is connected to the bearing plate 30 and to a pressure transmission plate 40 using fixing elements 226. When the capacitor support system is prepared for use, inter alia in subsea applications, the fixing elements 226 are removed on the upper and the lower part of the transport rod 225 so that in response to the forces generated by the leaf springs 300 the transmission plate 40 can change its height and will be pressed on an upper surface of the stack of capacitors. When the capacitor support system is used subsea in a depth of up to 3000 meters or more, the capacitor will be compressed and deformed as the ambient pressure increases. A typical height change for the capacitor stack having a height of 400 mm can be around 10 mm. This change in height will be absorbed by the pressure generating module including the leaf springs 300).

The embodiment of FIG. 2 showing a side view of a capacitor support system differs from the embodiment shown in FIG. 1 in that only seven capacitors are provided in the stack. However, the functioning of the whole capacitor support system is the same as explained above in connection with FIG. 1. Both embodiments comprise at their lower parts the bottom plate 21 followed by an isolating plate 23 and a rubber sheet 24).

Figure 4:
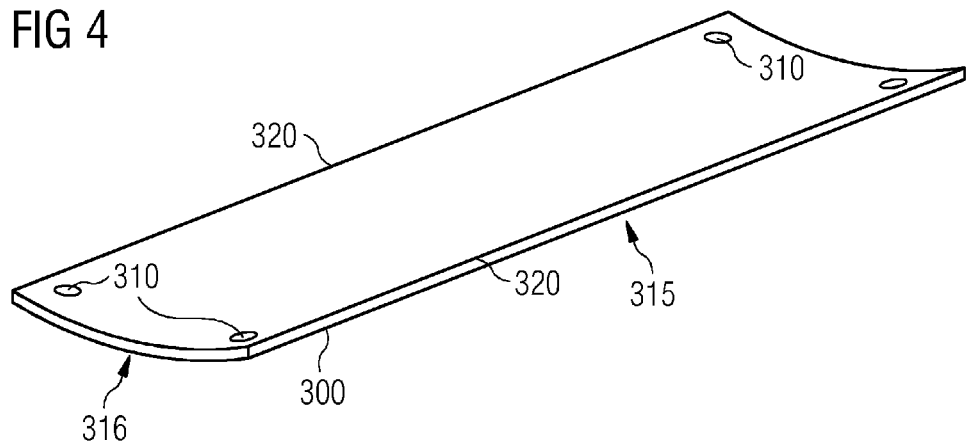
FIG. 4 shows a perspective view of one leaf spring used in the capacitor support systems of FIGS. 1-3.

FIG. 3 shows a rear view of the system shown in FIG. 2 with seven capacitors 11 being provided in the stack. In FIG. 3, the different leaf springs are shown and the arrangement of the leaf springs 300 relative to each other. The leaf spring which is formed as an arc shape plate as shown in FIG. 4 comprising throughholes 310 through which a guiding pin 50 shown inter alia in FIGS. 3 and 8 passes. The guiding pin guides the movement of the leaf springs when the leaf springs move in reaction to changing ambient pressure conditions.

The pressure generating module comprising inter alia the bearing plate 30), the transmission plate 40 and the leaf springs 300 will now be discussed in connection with FIGS. 4 to 6 and 8. As can be deduced from these Figs., the leaf spring is an arc shaped plate which covers a ground surface which substantially corresponds to the surface covered by one capacitor. As can be deduced from FIGS. 3 and 8, the leaf springs are provided in pairs of leaf springs, in the embodiment shown in FIGS. 3 and 8, five pairs 301-305). In each pair 301-305), two leaf springs are arranged relative to one another in such a way that the leaf springs are not arranged parallel to one another, meaning that the curvature has the same orientation, but anti parallel, meaning that the arc shaped plates contact each other at the outer ends or outer edge sections 320 of the plate 300). As can be especially deduced from FIG. 5, where one pair of leaf springs 301 is shown, the arc shaped plates only contact one another at the outer edge section and a free space 350 is generated between two leaf springs having the maximum height h at the apex 316 of the plates as shown in FIG. 5.

Figure 5:
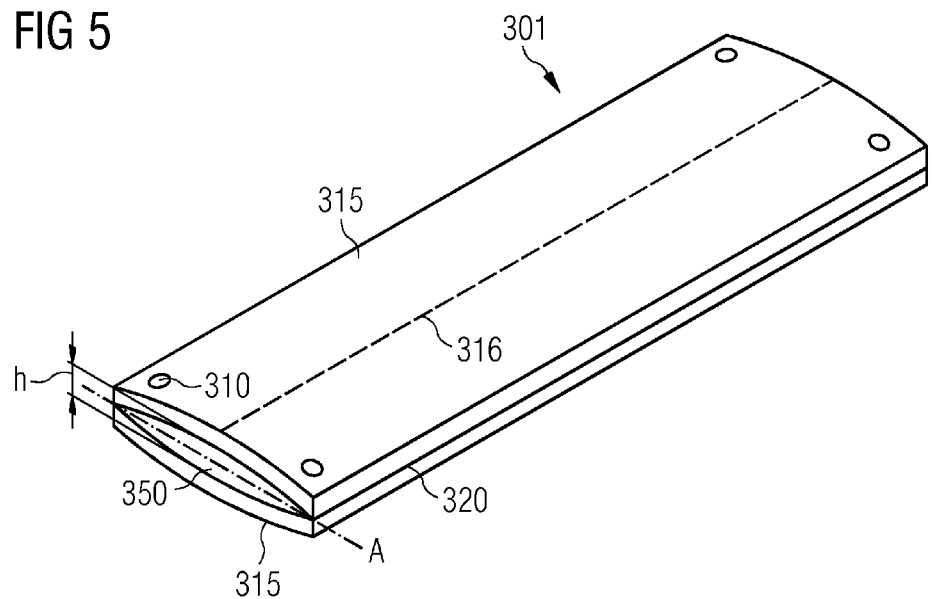
FIG. 5 shows the arrangement of two leaf springs in a pair of leaf springs relative to one another in a capacitor support system as shown in FIGS. 1-3.

The pair of leaf springs provide convex shaped outer surfaces 315 with the apex 316 as shown by the dashed line in FIG. 5. As can be deduced from FIG. 5, the possible deformation provided by each pair of springs is the height h. As can be deduced from FIGS. 3 and 8, two neighbouring pairs of leaf springs contact one another in their apex 316). With this arrangement of the leaf springs, when n pairs of leaf spring pairs are used, the maximum possible deflection of the springs is n×h. As can be furthermore deduced from FIGS. 3, 6 and 8, in the lowest spring pair, spring pair 305 in FIG. 8, the leaf spring next to the transmission plate contacts the planar transmission plate with its apex. The transmission plate transmits the force generated by the springs as a pressure to the stack of capacitors. As the apex contacts more or less the centre line of the planar transmission plate 40), it can be ensured that high pressure is transmitted to the central section of the capacitor and not to the border sections with the arrangement shown in FIG. 5 of the pair of leaf springs, a spring system is provided that has a low spring constant (a low Newton/mm corresponding to a high compliance which is the inverse of the spring constant). As a consequence, the spring force is high even when the spring is relaxed.

This is explained in the following example assuming a spring with a spring rate of 10 N/mm, 10 N are necessary to compress the spring by 1 mm, the resulting compliance being 0.1 mm/N. If two springs are placed on top of each other as shown in FIG. 5, meaning that they have an anti-parallel orientation, each spring compresses 1 mm if 10 N are applied. This gives a spring rate of 10 N/2 mm=5 N/mm. If it is assumed that each spring is fully compressed using 10 N of force and placed onto the capacitor and if the capacitor now shrinks by 0.5 mm the remaining spring force for one spring would be 10 N−10 N/mm×0.5 mm=5 N. If, however, two springs are used as shown in FIG. 5, the remaining spring force would be 10 N−5 N/mm×0.5 mm=7.5 N. Thus, if two springs are used in the anti-parallel orientation, less force will be lost when the spring system is relaxed by a certain length.

If, however, two springs are arranged parallel to each other and not anti-parallel as shown in FIG. 5, twice the force is needed to compress the parallel springs by 1 mm, resulting in a spring rate of 20 N/mm. Thus, if a higher force for a given compression is needed, two leaf springs could be arranged parallel to one another, one on top of the other.

In the embodiment of FIG. 5, the pair of leaf springs is arranged mirror symmetrically to axis A which is defined by the two lines where the two leaf springs contact each other.

Figure 8:
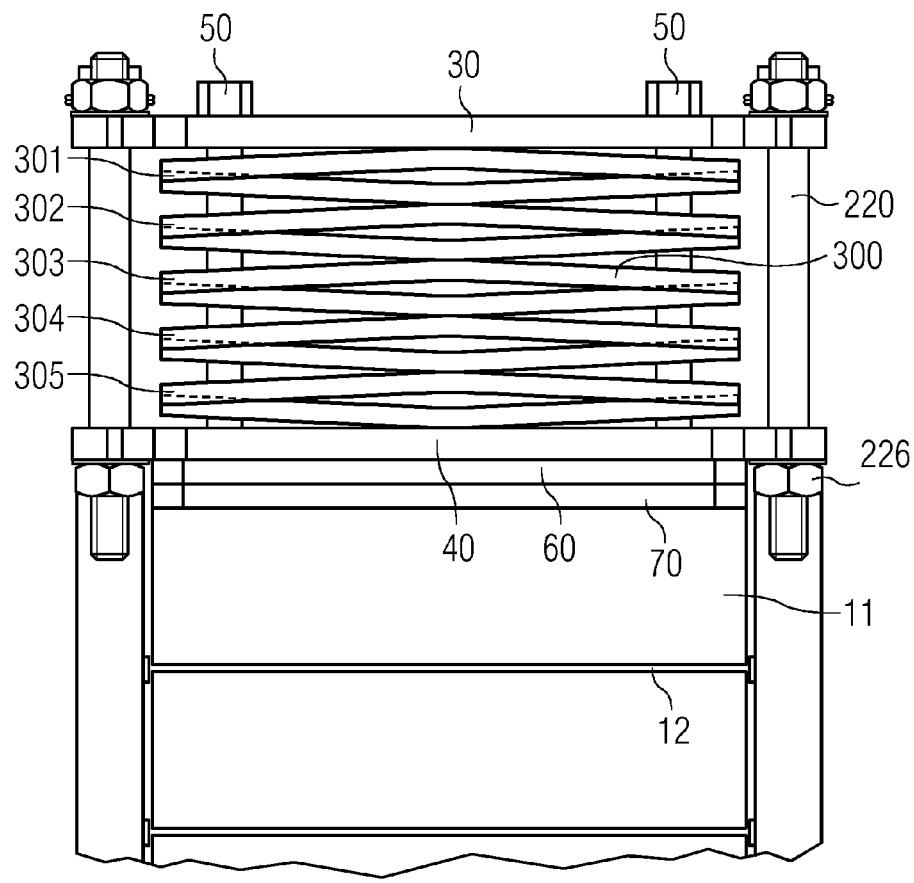
FIG. 8 shows a more detailed view of a pressure generating module in the capacitor support system as shown in FIGS. 1 to 3.

In the embodiments shown in FIGS. 3 and 8, the fixing elements 226 of the small rod 225 are still in place so that the pressure transmission plate which transmits the pressure generated by the springs to the capacitors cannot move freely. As can best be seen from FIG. 8, the planar pressure transmission plate 40 is located above a further insulating plate 60 followed by a rubber sheet 70). The rubber sheet 70 is provided to further improve the pressure distribution on the capacitor and is made of a softer material than the plates 40 or 60. By way of example, a polymer, Elastomere or rubber material may be used. However, it should be understood that this pressure distribution plate 70 need not necessarily be provided. A further rubber sheet 12 may be provided between each of the capacitors 11 in the stack.

Figure 6:
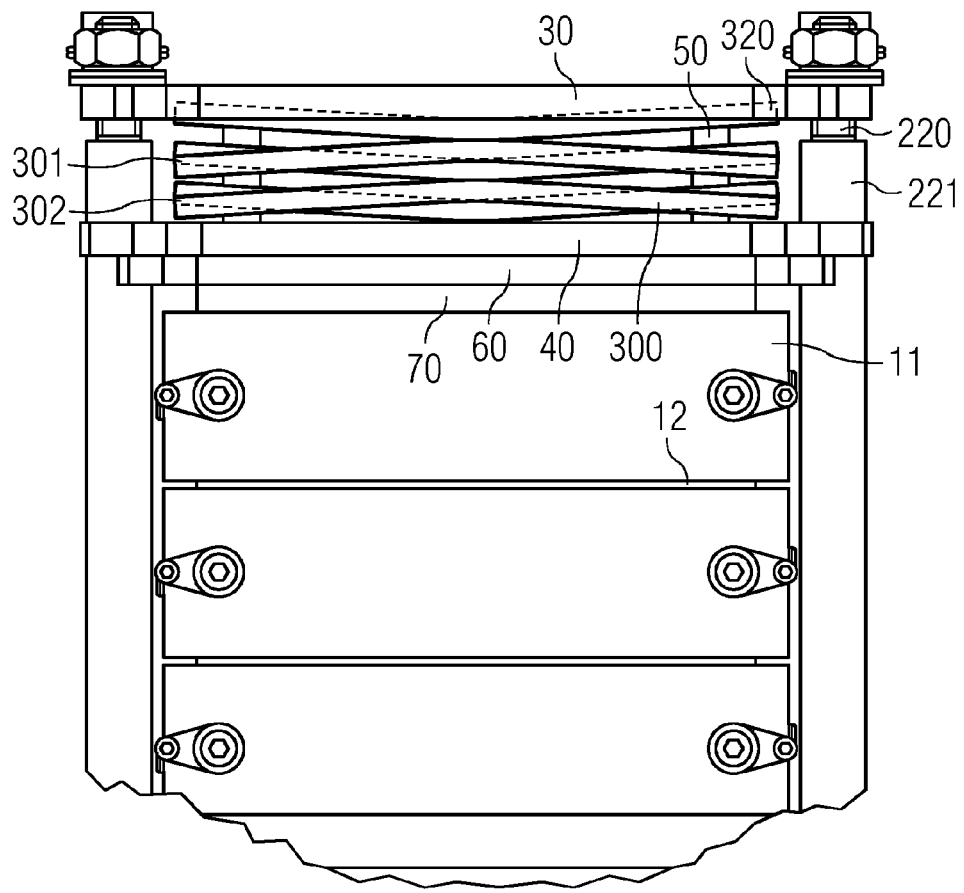
FIG. 6 shows a more detailed view of a pressure generating module provided in the capacitor support system as shown in FIG. 7.
Figure 7:
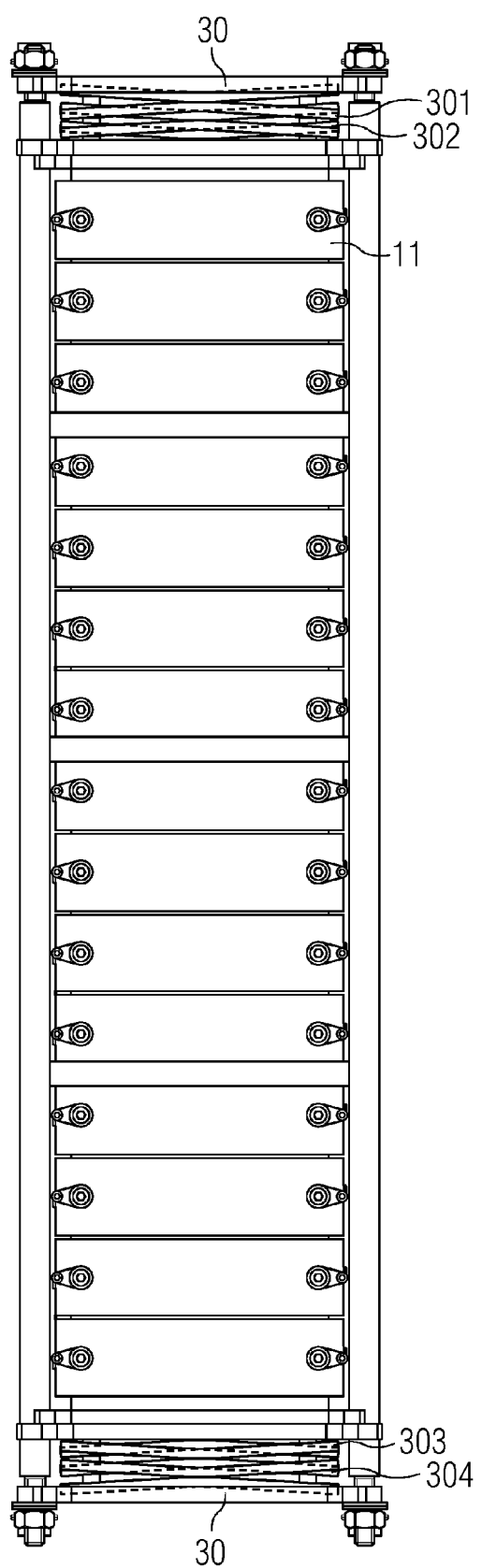
FIG. 7 shows another embodiment of a capacitor support system incorporating features of the invention.

FIGS. 6 and 7 show a slightly different embodiment, which differs from the embodiment shown in FIGS. 3 and 8 by the fact that first of all, less pairs of leaf springs are provided, namely only two pairs, namely pairs 301 and 302. In the embodiment of FIG. 6, the upper leaf spring contacting the bearing plate 30 is a single leaf spring and not a pair of leaf springs and contacts the upper plate not with its apex, but with its outer edge sections 320). However, in order to obtain a good pressure distribution on the capacitors, the leaf spring of pair 302 contacting the transmission plate 60 also contacts the plate with its apex as in the embodiment of FIGS. 3 and 8. Furthermore, the insulation 221 of the threaded rod 220 can be seen.

FIG. 6 is a more detailed view of an embodiment which is shown in FIG. 7, in which again 15 capacitors are provided in the stack. As can be deduced from FIG. 7, the pressure generating module is provided on the upper end and on the lower part of the capacitor support system. When the embodiment of FIGS. 6 and 7 is compared to the embodiment of FIGS. 3 and 8, it can be deduced that the total number of leaf springs was kept constant as two pairs of leaf springs, namely the pairs 301 and 302 are provided on the upper side, whereas pairs 303 and 304 are provided on the lower side. The last pair was separated with one spring being located at the upper bearing plate 30 and one spring being provided to contact the lower bearing plate 30). The construction provided on the lower side corresponds to the construction provided on the upper side as was discussed in detail in connection with FIG. 6 above.

Figure 9:
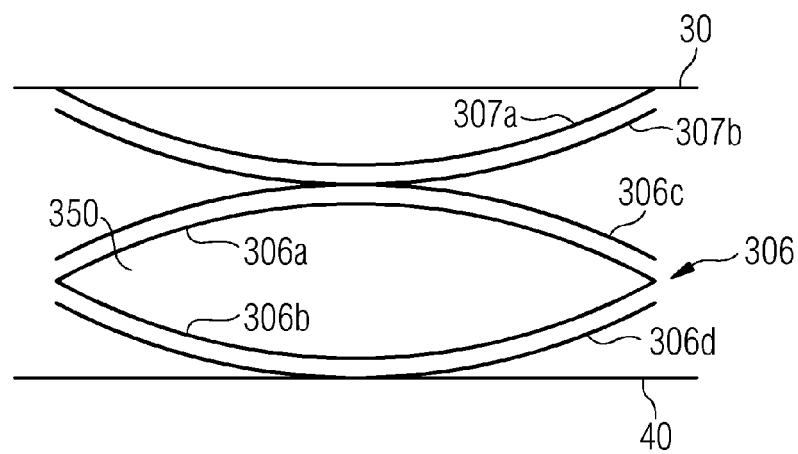
FIG. 9 shows a further arrangement of leaf springs in the capacitor support system.

FIG. 9 shows a further embodiment in which the spring rate is further increase as the plate shaped leaf springs are additionally provided parallel to each other. In the embodiment of FIG. 9, a pair of leaf springs 306 is provided. As in the embodiments discussed above, the pair comprises two leaf springs 306a and 306b which are facing with the apex in opposite directions. Each of the leaf springs 306a and 306b has a further leaf spring 306c and 306d so that opposite the closed space 350 between the inner leaf springs 306a and 306b another leaf spring 306c and 306d is arranged parallel to the corresponding leaf spring. Other leaf springs 307a and 307b are provided parallel to each other facing the bearing plate with its outer edges wherein the apex of leaf spring 307b contacts the apex of leaf spring 306c. If this embodiment is compared to an embodiment where only three leaf springs are provided (the leaf springs 307a, 306a and 306b), the spring rate is doubled as twice the force is needed to compress to parallel arranged leaf springs compared to an embodiment where only one leaf spring is arranged for each direction.

The leaf springs can be made of conventional spring steel or spring steel alloys. Furthermore, other materials may be used. In the embodiment described above, each pair of leaf springs comprises one leaf spring with the convex surface facing the upper part and the one leaf spring with the convex surface facing the opposite direction. It is also possible to connect one or more leaf springs to each of the two sides so that two parallel leaf springs are provided on each pair. This would increase the maximum spring force as discussed above.

The number of pairs of leaf springs can be selected in dependence on the expected overall spring deflection due to the varying capacitor height. The more capacitors are provided in the stack, the higher the height difference due to ambient pressure differences will be and the more leaf springs may be needed.

Summarizing, the above described capacitor support system with the pressure generating module provides a desired pressure distribution and an evenly distributed surface pressure on the capacitor so that the interlayer pressure in the capacitor is kept above a particular value even though the height of the capacitor stacks varies. The proposed solution furthermore has the advantage that a low overall height is achieved compared to conventional spiral springs. The number of spring pairs connected in series can be easily adapted to change the compliance of the spring and can thus be easily adapted to higher or lower ambient pressure by simply adding or removing spring pairs. When the ambient pressure is higher, each capacitor will shrink more so that the number of spring pairs needed will increase with the subsea level.

During vacuum impregnation, the pressure gradient caused by the leaf spring will facilitate the movement of gas bubbles towards the edge of the capacitor where it can escape by diffusion though the porous metal spray area provided on the lateral surface of the capacitor. This reduces the risk of gas bubbles being trapped inside the capacitor. Air bubbles can cause partial discharges that can destroy or reduce the lifetime of the capacitor. Furthermore, during self healing events in capacitor, gas bubbles are formed from the residue of the vaporized film material. The pressure gradient caused by the leaf spring will facilitate the movement of the gas towards the edges.

The invention claimed is:

1. A capacitor support system, comprising:
    a support structure configured to support at least one capacitor;
    a pressure generating module configured to generate a pressure on the at least one capacitor, the pressure generating module comprising:
    a bearing plate,
    a transmission plate, and
    at least one plate shaped leaf spring, provided between the bearing plate and the transmission plate, the pressure generating module being connected to the support structure by the bearing plate, and the bearing plate being fixedly connected to the support structure so as to provide a bearing surface for the at least one plate shaped leaf spring and keep the at least one plate shaped leaf spring in a compressed state between the bearing plate and the at least one capacitor, wherein the at least one plate shaped leaf spring includes at least one pair of plate shaped leaf springs, wherein two plate shaped leaf springs of the at least one pair of plate shaped leaf springs are arranged relative to each other between the bearing plate and the transmission plate such that the two plate shaped springs only contact each other at edge sections of the two plate shaped leaf springs and wherein a closed space is generated between the two plate shaped leaf springs that is closed in opposite directions by the two plate shaped leaf springs.

2. The capacitor support system of claim 1, wherein the pressure generating module furthermore comprises at least one guiding pin positioning the at least one pair of plate shaped leaf springs between the bearing plate and the transmission plate and guiding a movement of the at least one pair of plate shaped leaf springs, and wherein each of the at least one pair of plate shaped leaf springs comprises at least one opening for receiving the at least one guiding pin.

3. The capacitor support system of claim 1, wherein each of the at least one pair of plate shaped leaf springs is configured to build a convex surface, and wherein convex surfaces of one pair of the at least one pair of plate shaped leaf springs extend in opposite directions.

4. The capacitor support system of claim 3, wherein the at least one pair of plate shaped leaf springs includes at least two pairs of plate shaped leaf springs, wherein one leaf spring of one pair of the at least one pair of plate shaped leaf springs and one leaf spring of a neighbouring pair of plate shaped leaf springs contact each other at their apex.

5. The capacitor support system of claim 3, wherein the convex surface of one of the leaf springs of the at least one pair of plate shaped leaf springs faces the bearing plate, whereas the convex surface of the other of the leaf springs of the at least one pair of plate shaped leaf springs faces the transmission plate.

6. The capacitor support system of claim 3, wherein an apex of one of the convex surfaces of one leaf spring contacts the transmission plate.

7. The capacitor support system of claim 1, wherein at least one pair of plate shaped leaf spring covers a same surface as the bearing plate and the transmission plate.

8. The capacitor support system of claim 1, wherein the at least one pair of plate shaped leaf springs cover the same surface as the at least one capacitor.

9. The capacitor support system of claim 1, further comprising:
a pressure distribution plate located between the transmission plate and an upper surface of the at least one capacitor, the pressure distribution plate including a relatively higher elasticity than the transmission plate.

10. The capacitor support system of claim 1, wherein the support structure comprises at least one threaded rod, wherein the bearing plate includes at least one through hole in which a corresponding at least one threaded rod is located and wherein the pressure generating module is connected to the support structure via the at least one threaded rod.

11. The capacitor support system of claim 1, wherein two pressure generating modules are provided with one pressure generating module provided at one end of the support structure, the other pressure generating module being provided at an opposite end of the support structure.

12. The capacitor support system of claim 1, wherein at least two plate shaped leaf springs are arranged parallel to each other, one on top of the other between the bearing plate and the transmission plate.

13. The capacitor support system of claim 12, wherein each pair of at the at least one pair of plate shaped leaf springs comprises, for each leaf spring of each pair, at least one other leaf spring arranged parallel to a corresponding leaf spring and on top of the corresponding leaf spring.

14. A subsea variable speed drive, comprising:
the capacitor support system of claim 1.

15. The capacitor support system of claim 2, wherein each of the at least one pair of plate shaped leaf springs is configured to build a convex surface, and wherein the convex surfaces of one pair of the at least one pair of plate shaped leaf springs extend in opposite directions.

16. The capacitor support system of claim 15, wherein the at least one pair of plate shaped leaf springs includes at least two pairs of plate shaped leaf springs, wherein one leaf spring of one pair of the at least one pair of plate shaped leaf springs and one leaf spring of a neighbouring pair of plate shaped leaf springs contact each other at their apex.

17. The capacitor support system of claim 15, wherein the convex surface of one of the leaf springs of the at least one pair of pair of plate shaped leaf springs faces the bearing plate, whereas the convex surface of the other of the leaf springs of the at least one pair of pair of plate shaped leaf springs faces the transmission plate.

18. The capacitor support system of claim 4, wherein an apex of one of the convex surfaces of one leaf spring contacts the transmission plate.

19. The capacitor support system of claim 5, wherein an apex of one of the convex surfaces of one leaf spring contacts the transmission plate.

20. The capacitor support system of claim 1, wherein at least two plate shaped leaf springs are arranged parallel to each other, one on top of the other between the bearing plate and the transmission plate.

21. A subsea variable speed drive, comprising:
the capacitor support system of claim 3.

22. A capacitor support system, comprising:
a support structure configured to support at least one capacitor;
a pressure generating module configured to generate a pressure on the at least one capacitor, the pressure generating module comprising:
a bearing plate,
a transmission plate, and
at least one plate shaped leaf spring, provided between the bearing plate and the transmission plate, the pressure generating module being connected to the support structure by the bearing plate, and the bearing plate being fixedly connected to the support structure so as to provide a bearing surface for the at least one plate shaped leaf spring and keep the at least one plate shaped leaf spring in a compressed state between the bearing plate and the at least one capacitor; and
a pressure distribution plate located between the transmission plate and an upper surface of the at least one capacitor, the pressure distribution plate including a relatively higher elasticity than the transmission plate.

23. A subsea variable speed drive, comprising:
the capacitor support system of claim 22.

* * * * *